(12) United States Patent
Lee et al.

(10) Patent No.: US 7,079,194 B2
(45) Date of Patent: Jul. 18, 2006

(54) RADIO FREQUENCY MODULATOR HAVING C/L DELAY COMPENSATION FUNCTION, AND SET-TOP-BOX USING THE SAME

(75) Inventors: Jong Jin Lee, Kyungki-do (KR); Sang Suk Kim, Kyungki-do (KR); Chae Dong Go, Kyungki-do (KR); Youn Joong Lee, Seoul (KR); Kyoung Soo Kwon, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 529 days.

(21) Appl. No.: 10/367,828

(22) Filed: Feb. 19, 2003

(65) Prior Publication Data

US 2003/0156228 A1     Aug. 21, 2003

(30) Foreign Application Priority Data

Feb. 19, 2002  (KR) ................ 10-2002-0008688
May 6, 2002    (KR) ................ 10-2002-0024740

(51) Int. Cl.
*H04N 5/40* (2006.01)

(52) U.S. Cl. ............... 348/724; 725/151; 348/723

(58) Field of Classification Search ............ 348/723, 348/724, 642, 725, 726, 668, 669, 663, 192, 348/608, 609, 613, 487; 725/151
See application file for complete search history.

(56) References Cited

U.S. PATENT DOCUMENTS

| 4,747,159 | A  |   | 5/1988  | Kato       |         |
|-----------|----|---|---------|------------|---------|
| 4,794,458 | A  | * | 12/1988 | Nagatomi   | 348/724 |
| 4,943,847 | A  | * | 7/1990  | Katznelson | 348/487 |
| RE34,169  | E  | * | 1/1993  | Osburn et al. | 348/645 |
| 5,748,261 | A  |   | 5/1998  | Pugel      |         |

* cited by examiner

*Primary Examiner*—Michael H. Lee
(74) *Attorney, Agent, or Firm*—Lowe Hauptman & Berner, LLP.

(57) ABSTRACT

An RF modulator includes a C/L delay compensation function of compensating for a delay of a luminance signal with respect to a chrominance signal occurring during demodulating a video signal in a TV set. The RF modulator includes a C/L delay compensation unit delaying a luminance signal by 170 nsec and combining the delayed luminance signal with a chrominance signal to output a composite image signal having a C/l delay of −170 nsec and a frequency modulation unit modulating the video signal received from the C/L delay compensation unit into a high frequency signal of a predetermined broadcasting channel in a single module or package. The RF modulator outputs a video signal having the luminance signal delayed by 170 nsec with respect to the chrominance signal and complies with a C/L delay standard without adding any additional C/L delay compensation unit to the RF modulator.

22 Claims, 17 Drawing Sheets

<FREQUENCY RESPONSE>

<GROUP-DELAY RESPONSE>

RADIO FREQUENCY MODULATOR HAVING C/L DELAY COMPENSATION FUNCTION, AND SET-TOP-BOX USING THE SAME

CROSS-REFERENCE TO RELATED APPLICATION

This application claims to benefit of Korean Patent Application No. 2002-8688 filed Feb. 19, 2002, and 2002-24740 filed May 6, 2002, in the Korean Intellectual Property Office, the disclosure of which is incorporated herein by reference.

BACKGROUND OF THE INVENTION

1. Field of the Invention

The present invention relates to a radio frequency modulator of a set-top box modulating a video signal of a base band signal into a frequency signal receivable in a TV set, and more particularly, to a frequency modulator having a compensating function compensating for a delay of a chrominance signal with respect to a luminance signal occurring in demodulating a C/L signal in a TV set, and a set-top-box using the same.

2. Description of the Related Art

Generally, a subscriber signal conversion apparatus is required to receive a cable broadcasting signal or a satellite broadcasting signal or use a next generation two-way multimedia telecommunication service, such as a video-on-demand through a TV set, home shopping, a network game, etc. The subscriber signal conversion apparatus is a home telecommunication terminal coupled to the TV set and is called a set-top-box (STB) representing a box disposed on the TV set (hereinafter called as the STB).

The STB includes a basic function of converting a video signal to a public broadcasting channel signal which is received in the TV set. An apparatus for performing the basic function is called a RF modulator.

FIG. 1 is a diagram showing a connection relationship between a demodulator of a TV set and an RF modulator (high frequency modulator) of a conventional set-top-box (STB). A video signal generated from the STB is demodulated in an RF modulator 1 to a broadcasting channel signal to be transmitted to an input terminal of the TV set. The input video signal is inputted to a demodulator 3 through a tuner 2 and demodulated to a base band video signal in the demodulator 3.

Generally, the video signal includes a luminance signal and a chrominance signal. The luminance signal is pulse signals having a bandwidth of about 4.2 MHz, and the chrominance signal is an analog signal having a frequency of 3.5 MHz. A combination of the luminance signal and the chrominance signal is called a composite video signal. In the video signal having the above luminance signal and the chrominance signal, a delay occurring between the luminance signal and the chrominance signal in a demodulation process is called a C/L delay. The C/L delay represents a delayed period of time of the chrominance signal of 3.58 MHz with respect to the luminance signal having about 400 KHz, and the C/L delay of 170 nanoseconds (nsec) during the demodulation process in the TV set.

The C/L delay of the 170 nsec occurs during a demodulating process of the demodulator 3. A picture quality is lowered due to a delay between the luminance signal and the chrominance signal displayed on a TV screen.

Accordingly, in the video signal transmitted from a broadcast company, the luminance signal is delayed with respect to the chrominance signal by the 170 nsec to compensate for the C/L delay so that the picture quality of the video signal is maintained. That is, the C/L delay of the video signal transmitted from the broadcasting company is −170 nsec.

The STB is required to employ a C/L delay compensation function to output the video signal having the luminance signal delayed with respect to the chrominance signal by 170 nsec.

FIG. 2 is a diagram showing the RF modulator 1 compensating for the C/L delay in the STB shown in FIG. 1. A delay compensation circuit (C/L delay circuit or C/L delay compensation circuit) 4 is coupled between a video signal input terminal and the RF modulator 1 to generate a −170 nsec delay between the luminance signal and the chrominance signal of the composite video signal.

Since the C/L delay circuit 4 is mounted on an outside of the RF modulator 1, a noise component existing on a main board of the STB is introduced into the C/L delay circuit 4 to generate a bad effect on the picture quality. Moreover, since the C/L delay circuit 4 is separately mounted on the main board, it is difficult to minimize the STB in size. Furthermore, a set developing period for developing the STB is extended since a set manufacturer needs to finish reviewing circuit characteristics of the STB when we design the STB.

FIG. 3 is a circuit diagram showing the delay compensating circuit 4 of the STB shown in FIG. 1. The delay compensating circuit 4 includes a delay compensation unit 11a and a notch filter unit 11b to linearly change a phase of the video signal to generate the delay between the luminance signal and the chrominance signal. The delay compensating circuit 4 constitutes a plurality of capacitors C, a plurality of inductors L, and a saw filter to form a sound trap of 4.5 MHz.

Therefore, the conventional delay compensating circuit becomes larger in size due to a circuit compensating for the C/L delay using the inductors L and has problems in integrating the circuit in an IC due to the saw filter used for the sound trap.

In order to solve the above problems, such as an increase of the size of the STB or a load on the manufacturer assembling the STB, the C/L delay circuit has been sold as a separate unit, such as ceramic or a board. An assembling process of the STB may become easier. However, it is difficult to minimize the STB in size since the circuit is separately mounted on the main board of the STB.

SUMMARY OF THE INVENTION

In order to solve the above and/or other problems, it is an aspect to provide a RF modulator having a C/L delay compensation function of compensating for a delay of a chrominance signal with respect to a luminance signal generating during demodulating a video signal in a TV set.

It is another aspect of the invention to provide a RF modulator having a C/L delay compensation function capable of reducing the number of components used in a set-top box (STB) and enabling a maker to easily assemble the STB by mounting the C/L delay compensation function and a RF modulation function in a single chip or a package module.

It is another aspect of the invention to provide a set-top box (STB) easily assembled using a RF modulator having a C/L delay compensation function.

Additional aspects and advantages of the invention will be set forth in part in the description which follows and, in part, will be obvious from the description, or may be learned by practice of the invention.

To achieve the above and other aspects, a RF modulator having a C/L delay compensation function includes a RF modulator formed in a single board and including a C/L delay compensation unit receiving a video signal having a luminance signal and a chrominance signal, delaying the luminance signal by 170 nsec with respect to the chrominance signal in the video signal by performing a C/L delay function, and outputting the video signal having the delayed luminance signal, and a modulating unit modulating the video signal outputted from the C/L delay compensation unit to a high frequency signal of a broadcasting channel signal.

The C/L delay compensation unit of the RF modulator includes an input amplifier receiving the composite image signal as the video signal and amplifying the received composite image signal by a predetermined level, a C/L delay filter receiving the amplified composite image signal from the input amplifier, delaying the luminance signal by the 170 nsec with respect to the chrominance signal of the amplified composite image signal, and outputting the composite image signal having the delayed luminance signal and the chrominance signal, and an output amplifier amplifying the output composite image signal by a second predetermined level and outputting the amplified output composite image signal.

According to another aspect of the invention, a RF modulator includes a C/L delay compensation unit having a C/L delay filter delaying the luminance signal, and an adder adding the delayed luminance signal to the chrominance signal to generate a composite image signal.

The C/L delay compensation unit of the RF modulator includes a first buffer controlling the luminance signal of the video signal to a predetermined first level using a first gain, and a second buffer controlling the chrominance signal to a predetermined second level using a second gain.

BRIEF DESCRIPTION OF THE DRAWINGS

These and other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
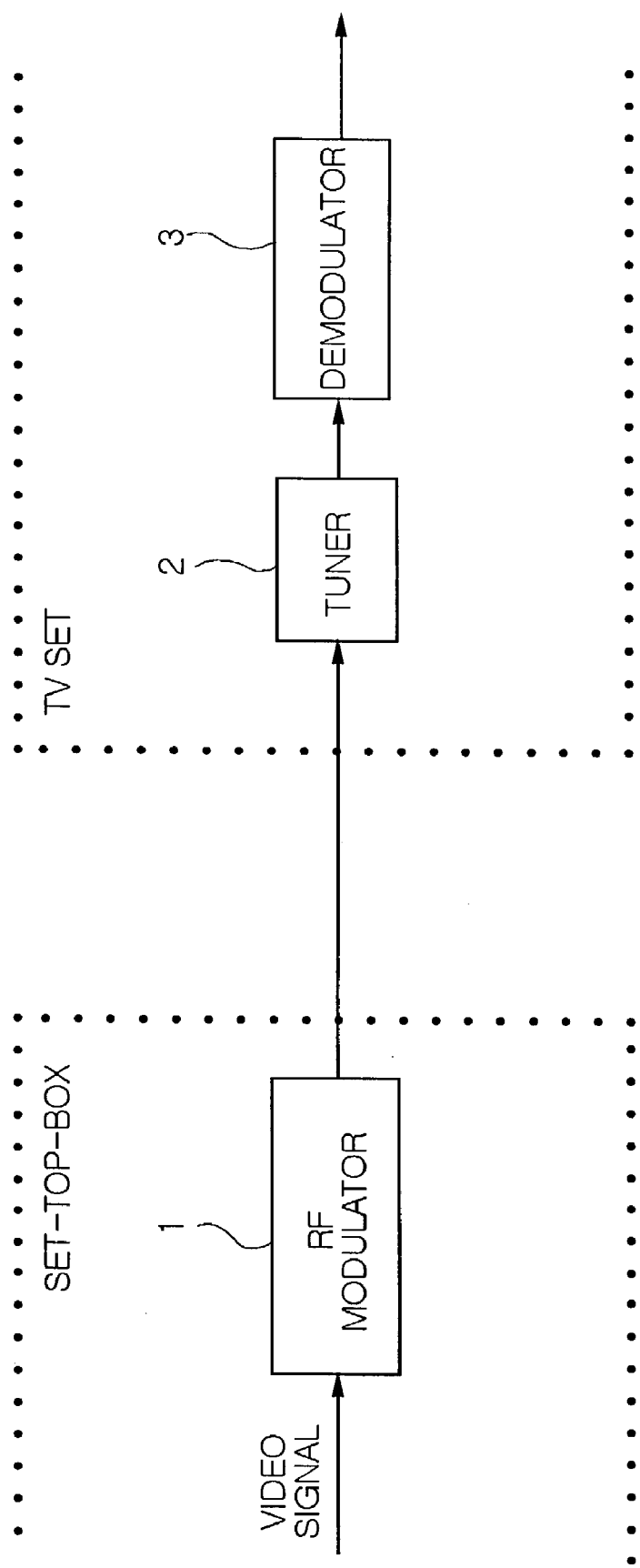
FIG. 1 is a diagram showing a connection relationship between a demodulator of a TV set and an RF modulator of a conventional set-top-box (STB)
Figure 2:
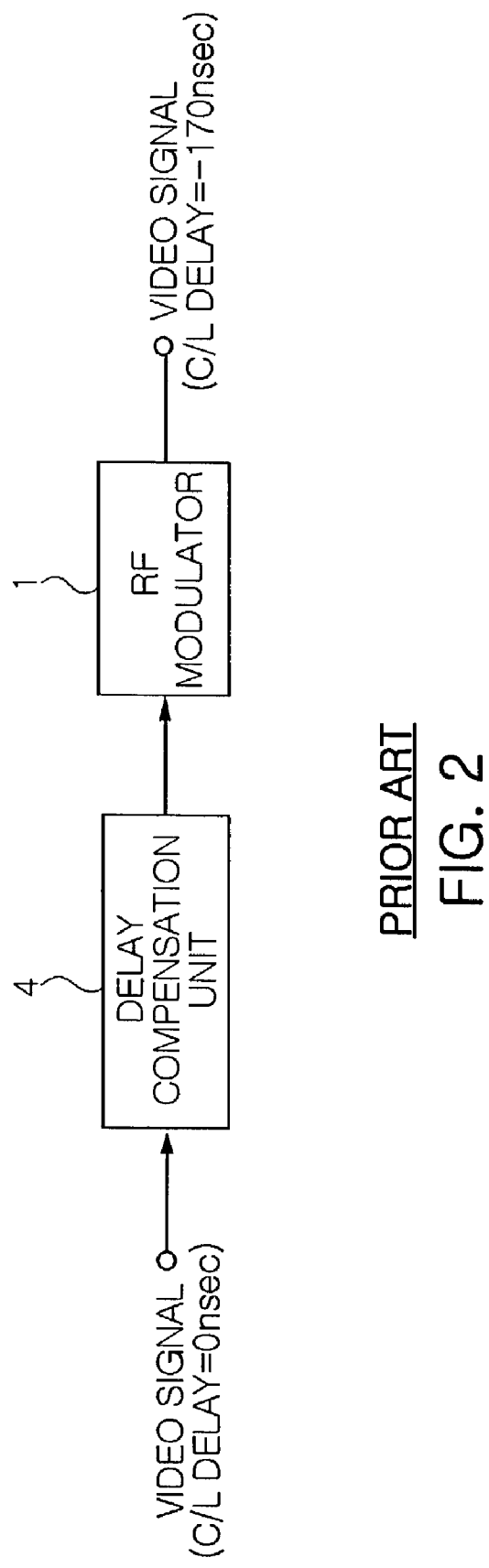
FIG. 2 is a diagram showing the RF modulator compensating for a C/L delay in the STB shown in FIG. 1.
Figure 3:
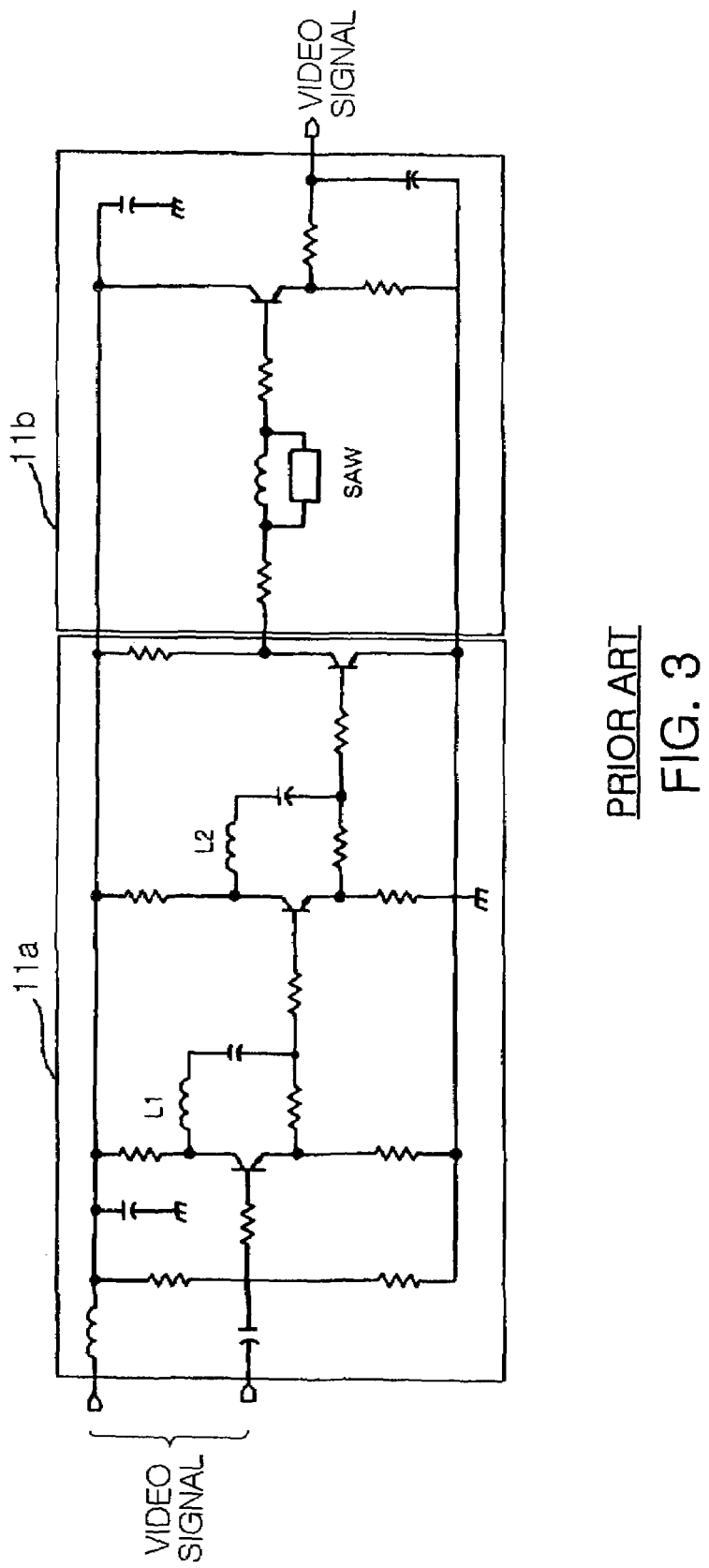
FIG. 3 is a circuit diagram showing a C/L delay compensating circuit of the STB shown in FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Hereinafter, an operation and a structure of an RF modulator (high frequency modulator) used in a set-top-box (STB) according to an embodiment of the present invention are described in reference with drawings.

Figure 4:
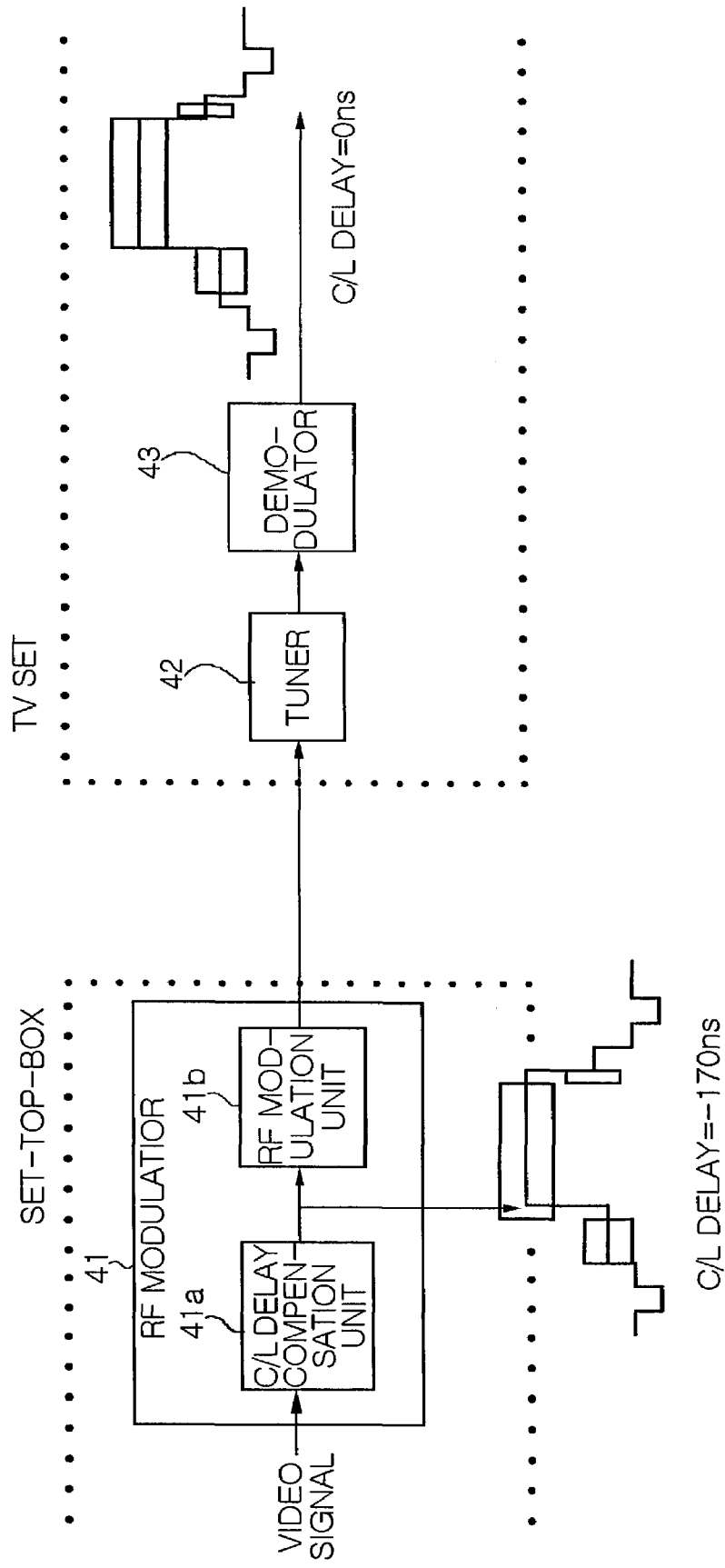
FIG. 4 is a block diagram showing an RF modulator according to an embodiment of the present invention.

FIG. 4 is a block diagram showing a STB using an RF modulator 41 according to an embodiment of the present invention. The RF modulator 41 includes a C/L delay compensation unit 41a outputting a luminance signal delayed by 170 nanoseconds (nsec) with respect to a chrominance signal in a video signal, and a RF modulation unit 41b modulating the video signal received from the C/L delay compensation unit 41a into a high frequency signal of a predetermined air (public) broadcasting channel and outputting the modulated high frequency signal.

The RF modulator 41 is formed with the C/L delay compensation unit 41a and the RF modulation unit 41b both realized in a single board to perform a C/L delay compensation function and a modulation function in a single module. The realization of the C/L delay compensation unit 41a and the RF modulation unit 41b in the single board represents that the RF modulator 41 is implemented (realized) in an integrated circuit (IC), in a single package, or in a single chassis.

Accordingly, by mounting only the RF modulator 41 having the above structure in the STB, both the C/L delay compensation function and the modulation function can be obtained.

The high frequency signal outputted from the RF modualtor 41 is inputted to a demodulation unit 43 through a tuner unit 42 of a TV set to be demodulated into a base band video signal. During a demodulation process of demodulating the high frequency signal into the base band video signal, a delay of 170 nsec occurs in the chrominance signal with respect to the luminance signal, and thus, an output video signal of the demodulation unit 43 has a C/L delay of 0 nsec between the chrominance signal and the luminance signal. As a result, an image in which luminance and chrominance correspond to each other, is displayed on a screen of the TV set.

As described above, the video signal is constituted of the luminance signal and the chrominance signal, and the luminance signal and the chrominance signal can be separated from each other or combined together an output of combined luminance and chrominance signals is called a composite image signal. That is, the composite image signal in which the luminance signal and the chrominance signal are combined, are generated from the STB.

The video signal inputted to the RF modulator 41 can be the composite image signal or signals in which the luminance signal and the chrominance signal are separated from each other. Depending on a type of the video signal, a structure of the C/L delay compensation unit 41a of the RF modulator can vary. Hereinafter, a structure and an operation of the C/L delay compensation unit 41a are explained according to the type of the video signal, i.e., the composite image signal or the signals in which the luminance signal and the chrominance signal are separated from each other.

In a case that the video signal is the composite image signal having combined luminance and chrominance signals, the structure and the operation of the RF modulator is explained below.

Figure 5:
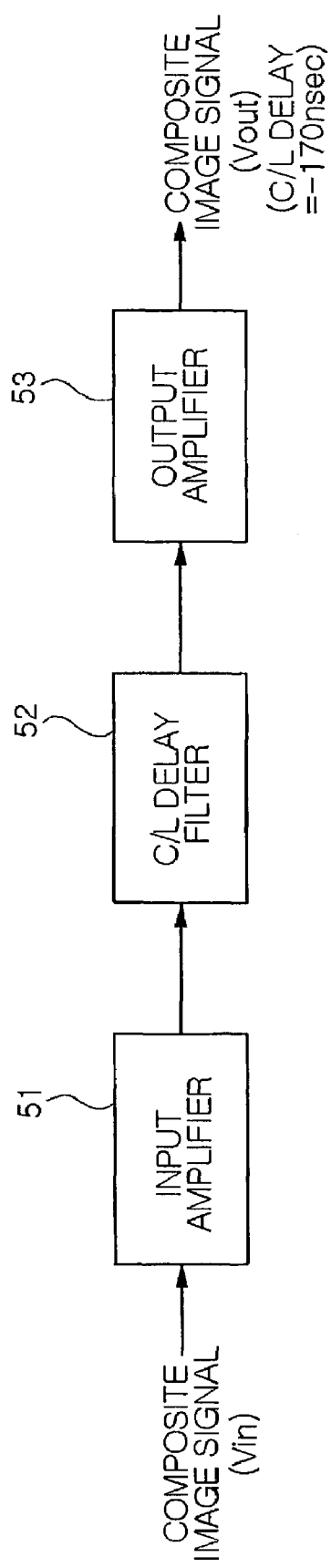
FIG. 5 is a diagram showing a C/L delay compensating circuit of the RF modulator of the STB shown in FIG. 4.

FIG. 5 is a diagram showing the C/L delay compensating unit 41a delaying the luminance signal by 170 nsec with respect to the chrominance signal, and the C/L delay compensation unit 41a receives the input video signal which is the composite image signal.

As shown in FIG. 5, the C/L delay compensation unit 41a includes an input amplifier 51 receiving the composite image signal as the input video signal and amplifying the received composite image signal by a predetermined level, a C/L delay filter receiving the amplified composite image signal from the input amplifier 51, delaying the luminance signal by 170 nsec with respect to the chrominance signal of the amplified composite image signal, and outputting the composite image signal having the C/L delay of −170 nsec between the luminance signal and the chrominance signal, and an output amplifier 53 amplifying the output composite image signal by a second predetermined level and outputting the amplified output composite image signal.

The C/L delay filter 52 is for the composite image signal having a luminance component L and a chrominance component C, and the luminance component L needs to be delayed by 170 nsec with respect to the chrominance component C.

The input and output amplifiers 51, 53 amplify the input and output composite image signals by the first and second predetermined levels, respectively, to maintain the amplitude of the composite image signal a desirable level. A circuit shown in FIG. 9 can used as the input and output amplifiers 51, 53.

Figure 9:
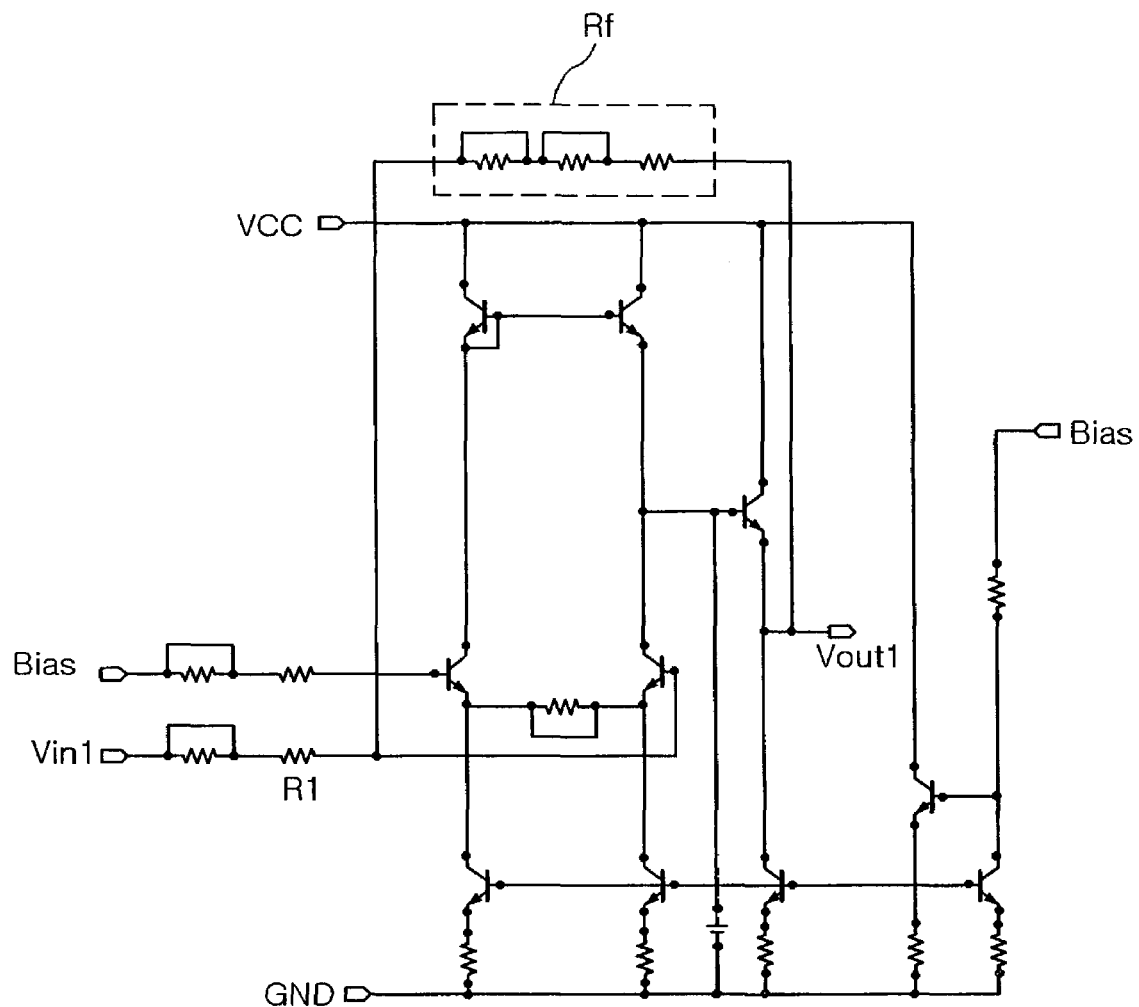
FIG. 9 is a view showing input and output amplifiers of the C/L delay compensating circuit shown in FIGS. 5 and 8.

In FIG. 9, the input and output amplifiers 51, 53 receive the input and output composite image signals through an input terminal Vin1 and output the amplified input and output composite image signals through an output terminal Vout1. The composite image signals outputted through the output terminal Vout1 is $$Vout1 \propto -\frac{Rf}{R1} \times Vin1.$$

A gain of the input and output amplifiers 51, 53 can be adjusted by adjusting a ratio of a resistance of an input resistor R1 of the input terminal Vin1 and a feedback resistance of a feedback resistor RF between the input terminal Vin1 and the output terminal Vout1.

This structure of the input and output amplifiers 51, 53 is well known, and the present invention uses this structure of FIG. 9 to compensate for a signal attenuation occurring in the C/L delay filter 52. Therefore, the structure of the input and output amplifiers 51, 53 is not limited to the circuit shown in FIG. 9, and any other circuit or amplifier which has the above functions can be used as the input and output amplifiers 51, 53. The C/L delay filter 52 can be realized in two ways which are described in FIGS. 6 and 8.

Figure 6:
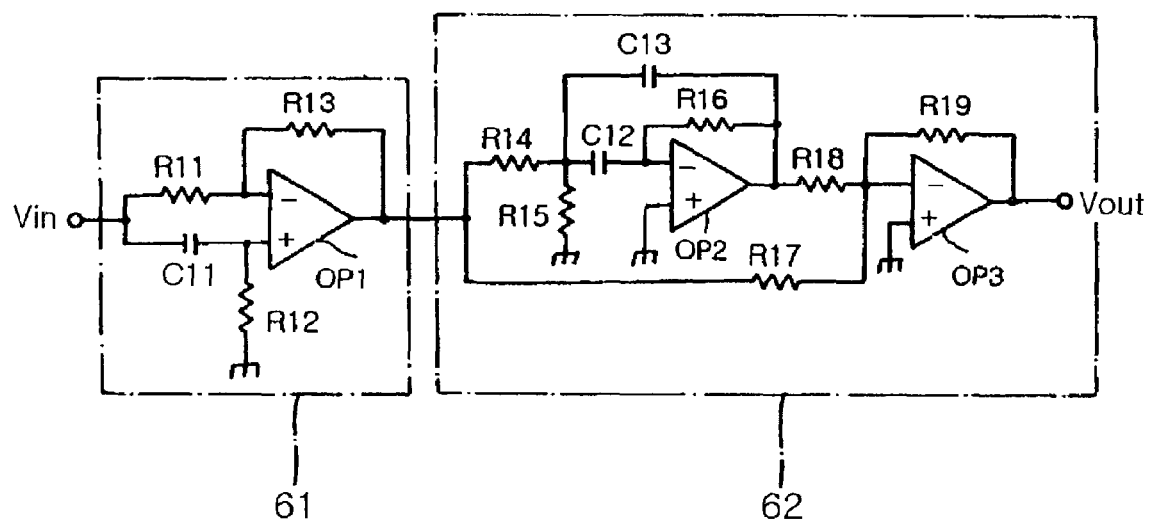
FIG. 6 is a circuit diagram of a C/L delay filter of the C/L delay compensating circuit shown in FIG. 5.

FIG. 6 is a circuit diagram of the C/L delay filter 52 shown in FIG. 5. The C/L delay filter 52 includes an input terminal Vin, a group-delay equalization circuit 61 group-delaying the luminance signal with respect to the chrominance signal by a desired amount between the luminance signal and the chrominance signal of the video signal, an output terminal Vout, and a notch filter 62 having a combination of resistors, capacitors, and inductors, and outputting a predetermined frequency signal among output signals of the group-delay equalization circuit 61 through the output terminal Vout.

The group-delay equalization circuit 61 includes a first operational amplifier OP1 having a negative input terminal (inverted input terminal) and a positive input terminal (non-inverted input terminal) coupled to the input terminal Vin through a resistor R11 and a capacitor C11, respectively. An output terminal of the first operational amplifier OP1 is coupled to the negative input terminal of the first operational amplifier OP1 through a resistor R13. A resistor R12 is coupled between ground and a junction between the capacitor C11 and the positive input terminal of the first operational amplifier OP1.

The notch filter 62 includes a second operational amplifier OP2 having a negative input terminal (inverted input terminal) receiving an output of the group-delay equalization circuit 61 through a resistor R14 and a capacitor C12 and a positive input terminal (non inverted input terminal) coupled to ground. A capacitor 13 is coupled between an output terminal of the second operational amplifier OP2 and a junction of the resistor R14 and the capacitor C12, and a resistor R15 is coupled to the junction of the resistor R14 and the capacitor C12. A resistor R16 is coupled between the output of the second operational amplifier OP2 and a junction of the capacitor C12 and the negative input terminal of the second operational amplifier OP2. The notch filter 62 further includes a third operational amplifier OP3 having a negative input terminal (inverted input terminal) receiving an output of the second operational amplifier OP2 through a resistor R18 and a positive input terminal (not inverted input terminal) coupled to ground. A resistor R17 is coupled between the output of the first operational amplifier OP1 and a junction of the resistor R18 and the negative input terminal of the third operational amplifier OP3, and a resistor R19 is coupled between an output of the third operational amplifier OP3 and a junction of the resistor R18 and the negative input terminal of the third operational amplifier OP3. The notch filter 62 forms a 4.5 MHz sound trap.

The group-delay equalization circuit 61 having the above structure performs a desired group-delay on a desired frequency band (luminance signal component), and the notch filter 62 outputs a signal having a predetermined frequency band among output signals of the group-delay equalization circuit 61. An operation of the group-delay equalization circuit 61 and the notch filter 62 will be described below.

In the group-delay equalization circuit 61, a group-delay a transfer function H(s), a phases$\beta$ ($\omega$), a group-delay $T_{GD}$ are expressed by the following formula 1.

$$H(s) = \frac{s-\alpha_0}{s+\alpha_0} = \frac{s - \frac{1}{RC}}{s + \frac{1}{RC}}, \quad \text{Formula 1}$$

$$\beta(\omega) = -2\tan^{-1}\left(\frac{\omega}{\alpha_0}\right),$$

$$T_{GD} = -\frac{d\beta(\omega)}{d\omega} = \frac{2\alpha_0}{\alpha_0^2 + \omega^2}$$

In the above formula 1, R is a total resistance of the resistors R11, R12, R13, C is a capacitance of the capacitor C11, s=jω, and ω=2π f.

The transfer function H(s) of the group-delay equalization circuit 61 is shown in formula 1, and the a phaseβ (ω)) and a group-delay $T_{GD}$ are also shown in formula 1. The group-delay $T_{GD}$ is a differential value of a phase of the transfer function H(s) as shown in formula 1.

Therefore, by adjusting a value of $\alpha_0$, a characteristic of the desired group-delay in the desired frequency band can be obtained. Here, since $\alpha_0$ is 1/RC, the group-delay of 170 nsec between the luminance signal component (400 KHz) and the chrominance signal component (3.58 MHz) van be obtained by adjusting the resistance value R and the capacitance value C of the group-delay equalization circuit 61. That is to sy, the luminance signal is delayed by 170 nsec with respect to the chrominance signal from the input composite image signal by setting the resistance value R and the capacitance value C of the group-delay equalization circuit 61.

An input and an output of the notch filer 62 are expressed by using the following formula 2.

$$H(s) = \frac{\frac{\omega_\gamma}{Q}s}{s^2 + \frac{\omega_\gamma}{Q}s + \omega_\gamma^2} \quad \text{Formula 2}$$

$$= \frac{s^2 + \frac{2R_{1a} - R_2}{R_1 R_2 C}s + \frac{1}{R_{1a}R_2 C^2}}{s^2 + \frac{2}{R_2 C}s + \frac{1 + R_{1a}/R_{1b}}{R_{1a}R_2 C^2}}$$

$$= \frac{Vout}{Vin}$$

Here, $R_{1a} = \frac{R2}{2}, R_2 = \frac{Q}{\pi f_\gamma C}, R_{1b} = \frac{R_{1a}}{2Q^2 - 1}.$ The sound trap can be formed in the desired frequency according to the resistance value and the capacitance value of the notch filter 62. For example, the transfer function having a notch filter characteristic in the notch filter 62 is obtained in the notch filter 62 as shown in the formula 2, if the transfer function has two poles and two zeros. Accordingly, by setting the resistance value R and the capacitance value C, the sound trap can be formed in the frequency of 4.5 MHz.

Figure 7A:
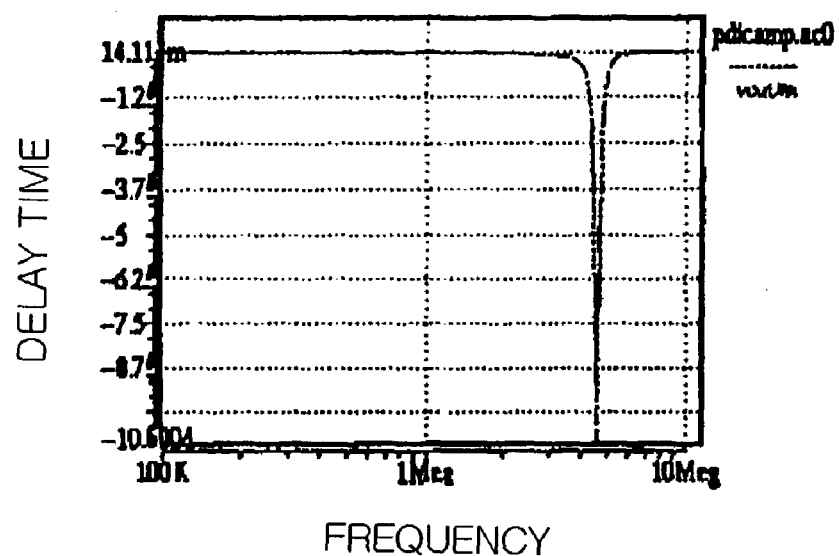
FIGS. 7A and 7B are graphs showing AC simulation results in the C/L delay filter shown in FIG. 6.
Figure 7B:
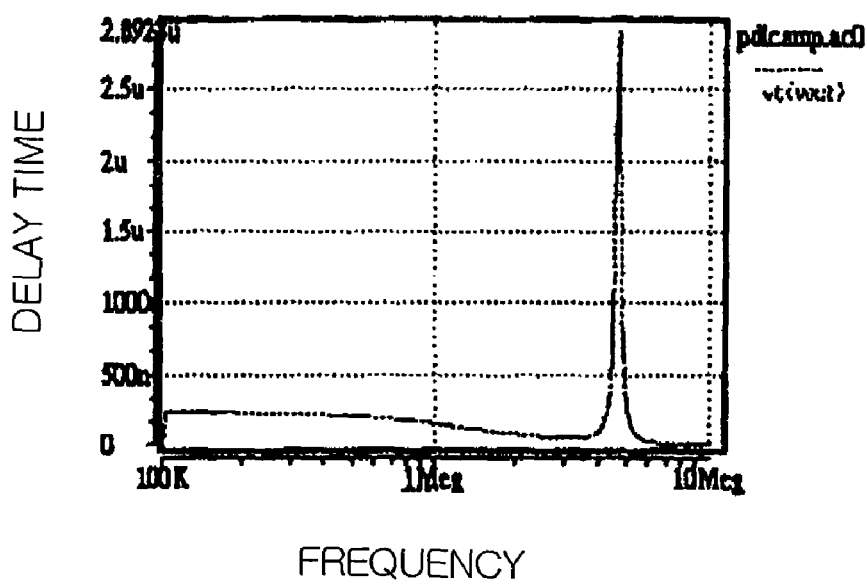

FIGS. 7A and 7B are graphs showing AC simulation results in the C/L delay filter 52 in an RF modulator integrated circuit (IC chip) having the RF modulator 41. FIG. 7A is a frequency response characteristic graph showing that the amplitude of the frequency of 4.5 MHz in the group-delay equalization circuit 61 is −8.6343 dB. FIG. 7B is a group-delay response characteristic graph of the group-delay equalization circuit 61 and shows a group-delay characteristic of 154.97 nsec between a basic frequency of 400 KHz in the luminance signal and the frequency band of 3.58 MHz corresponding to the chrominance signal.

Since a conventional C/L delay compensation circuit has a low pass characteristic, a predetermined frequency component is cut off, and a picture quality of the TV set becomes deteriorating. Accordingly, it is a disadvantageous for a user to watch a screen having the deteriorating picture quality occurring due to the cut-off frequency component. However, since the C/L delay compensation circuit 52 has an all pass characteristic in the group-delay equalization circuit 61 as shown in FIG. 6, the picture quality of the TV set can be improved. In addition, since the C/L delay compensation circuit 41a and the modulation 41b are integrated together in a modulator IC chip, the STB constructed according to the present invention becomes reduced in size compared to a conventional STB. The notch filter 62 is used for forming the 4.5 MHz sound trap.

Figure 8:
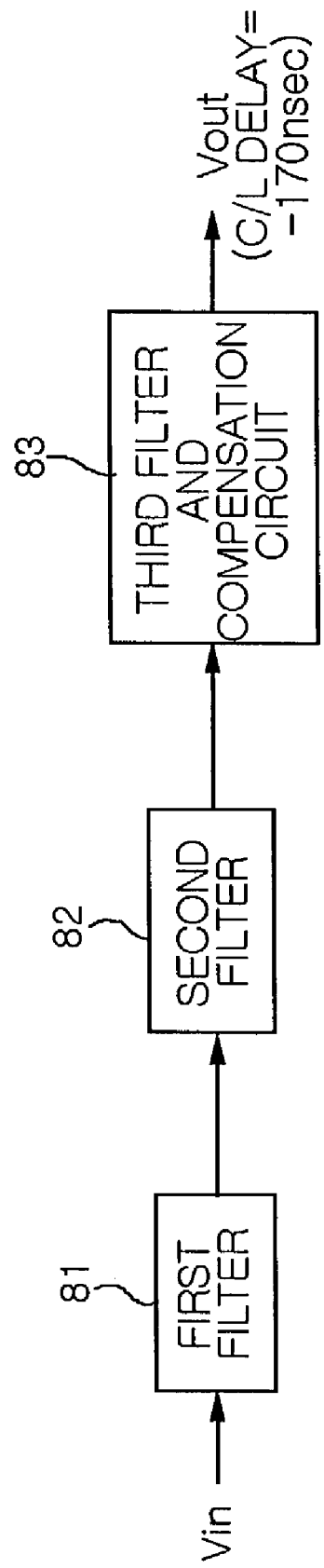
FIG. 8 is a diagram showing another example of the C/L delay compensating circuit of the RF modulator of the STB shown in FIG. 4.

FIG. 8 is a diagram showing another example of the C/L delay compensating circuit 52 shown in FIG. 5. The C/L delay compensating circuit 52 of FIG. 8 can perform the group-delay step by step using a plurality of group-delay filters.

The C/L delay compensating circuit 52 of FIG. 8 includes a first filter 81 delaying by a predetermined period of time the luminance signal with respect to the chrominance signal in the input composite image signal, a second filter 82 delaying by the predetermined period of time the luminance signal with respect to the chrominance signal in the composite image signal outputted from the first filter 81, and a third filter and compensation unit 83 delaying by the predetermined period of time the luminance signal with respect to the chrominance signal in the composite image signal outputted from the second filter and outputting the delayed luminance signal through an output terminal Vout.

The first and second filters 81, 82 has the same structure, and the third filter and compensation unit 83 includes the same structure as the first and second filters 81, 82 as well as a compensation function of controlling a delay dispersion. As described above, the C/L delay compensating circuit 52 of FIG. 8 includes the group-delay filters coupled in a cascade type to accurately control the group-delay of the luminance signal with respect to the chrominance signal. Although the C/L delay compensating circuit 52 of FIG. 8 includes three filters, the number of the filters may be increased and decreased according to demands.

Since the filters are coupled in the cascade type as the C/L delay compensating circuit 52 of FIG. 8, a peak phenomenon of a time domain in an edge portion of a signal becomes reduced. This reduction of the peak phenomenon is explained in FIGS. 10 through 12.

Figure 10:
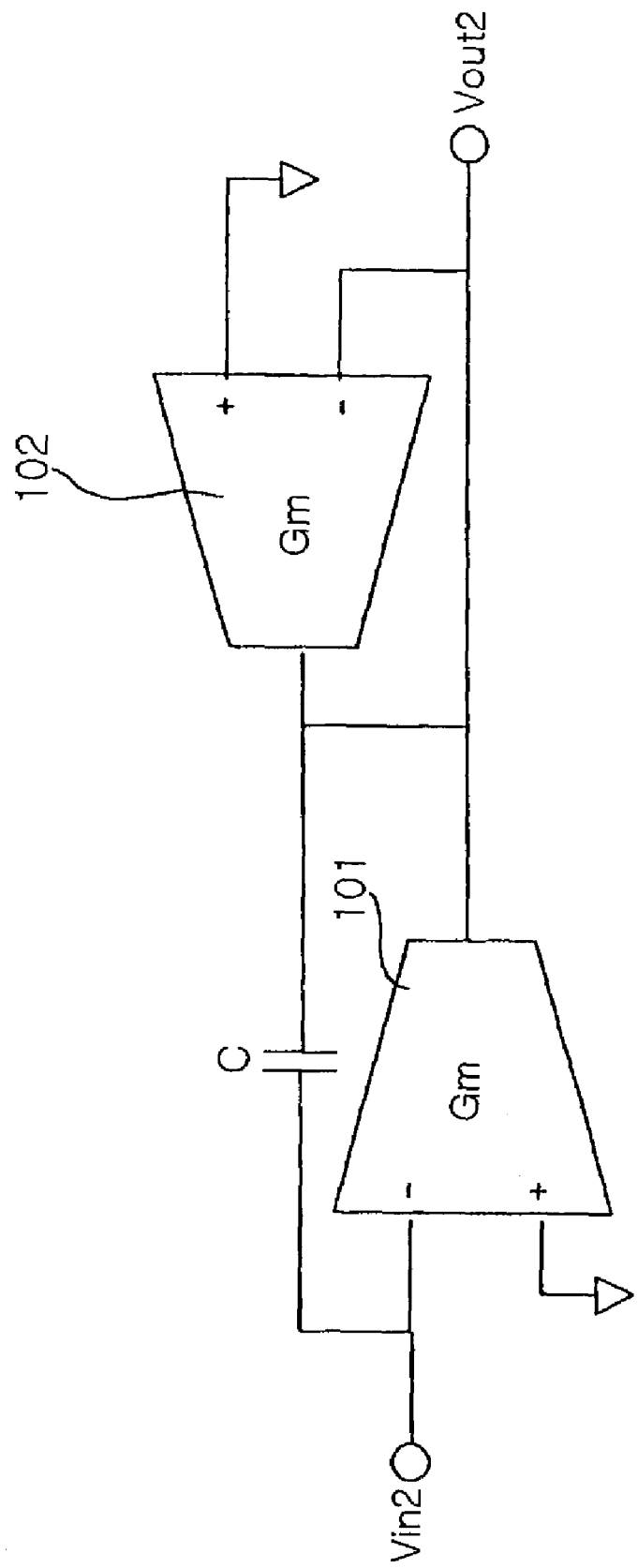
FIG. 10 is a block diagram showing a basic filter structure of a C/L delay filter of the C/L delay compensating circuit shown in FIG. 8.

FIG. 10 is a block diagram showing a basic filter structure of the group-delay filter used in the C/L delay compensation circuit 52 of FIG. 8. As shown in FIG. 10, the group-delay filter includes a first gain-cell (Gm) transconductor Gm (hereinafter, referred to as transconductor) 101 having a negative input terminal coupled to an input signal terminal Vin2, a positive input terminal coupled to ground, and an output terminal coupled to output signal terminal Vout2, and a second transconductor 102 having a negative input terminal coupled to the output signal terminal Vout2, a positive input terminal coupled to ground, an output terminal coupled to the output terminal of the first transconductor 101, and a capacitor C coupling outputs of the first and second transconductors to the output signal terminal Vout2.

Figure 11:
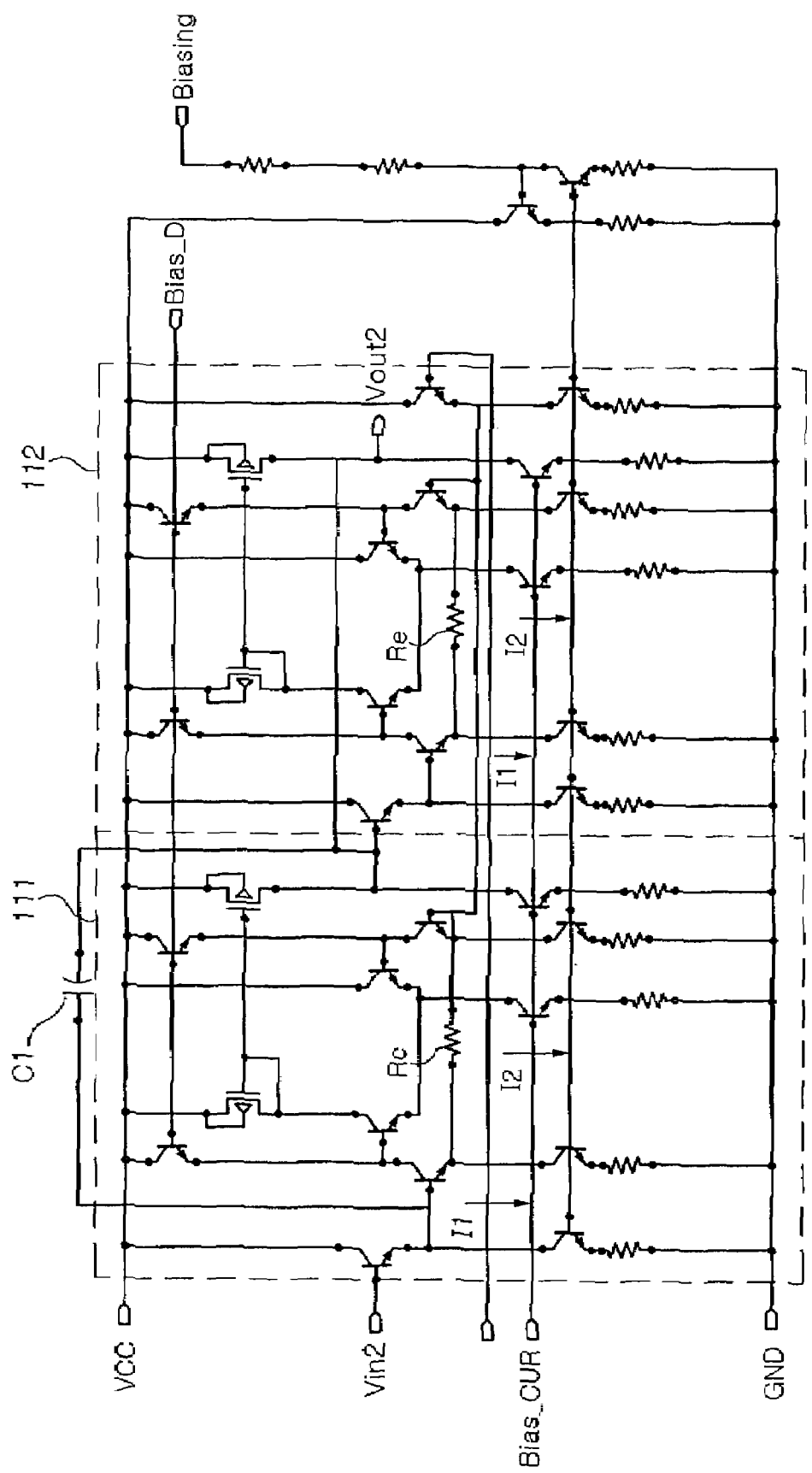
FIG. 11 is a circuit diagram showing first and second filter of the C/L delay filter of the C/L delay compensating circuit shown in FIG. 8.

The group-delay filter shown in FIG. 10 is well known, includes the first and second transconductors 101, 102 and the capacitor C, and is called a Gm-C filter. Here, the transconductor is an amplifier having a gain Gm of an output current with respect to an input voltage. FIG. 11 is a circuit diagram showing a basic group-delay filter structure of the C/L delay filter 52.

According to the filter shown in FIGS. 10 and 11, a characteristic of the filter is obtained from the following formula 3.

$$H(s) = \frac{s-p}{s+p}, p = \frac{Gm}{C}$$ Formula 3

$$Td = \frac{2p}{p^2 + w^2}$$

where H(s) is a transfer function representing a relationship between an output signal Vout with respect to an input signal Vin2 in the filter shown in FIG. 10, p is a pole determined by a ratio of a capacitance of the capacitor C and the gain (Gm) of the first and second transconductor 101, 102, and Td represents a delay time.

According to formula 3, since the delay time Td is determined by the pole and w(=2π f), and the pole is a ratio of the capacitance of the capacitor C and the gain Gm of the first and second transconductors 101, 102, the delay time can be adjusted by controlling the gain Gm of the first and second transconductors 101, 102 although it is difficult to adjust the capacitance of the capacitor C. Since the delay time Td is a function inverse proportional to w(=2π f), the delay time T is inverse proportional to the frequency f. That is, the Gm-C filter can generate a relatively different delay between the frequencies using different delay time, and as a result, the group-delay can be possible in a predetermined frequency band.

In FIG. 11, Vin2 is an input signal terminal through which the input composite image signal, Vout2 is an output signal terminal through which the group-delayed composite image signal is outputted. The gain Gm of the first and second transconductors 101, 102 is expressed by the following formula 4 according to bias current I1, I2 and an emitter resistance Re.

$$Gm = \frac{I_2}{2\text{Re} \times I_1}$$ Formula 4

Therefore, the gain Gm of the first and second transconductors 101, 102 by changing the bias current $I_2$ of the first and second transconductors 101, 102. As a result, the delay time can be adjusted according to the formula 3 by changing a position of the pole of the filter.

The first and second filter 81, 82 constructed as shown in FIGS. 10 and 11 delays the luminance signal with respect to the chrominance signal in the input composite image signal, which is transmitted through the input signal terminal Vin2 by a value corresponding to the gain Gm of the first and second transconductors 111, 112 of FIG. 11 and outputs the composite image signal having the delayed luminance signal through the output signal terminal Vout.

The third filter and compensation unit 83 is further provided with a compensation circuit added to the same structure of the first or second transconductor 81, 82, which is shown in FIG. 10, to compensate for a delay dispersion to accurately obtain the desired delay time on the luminance signal.

Figure 12:
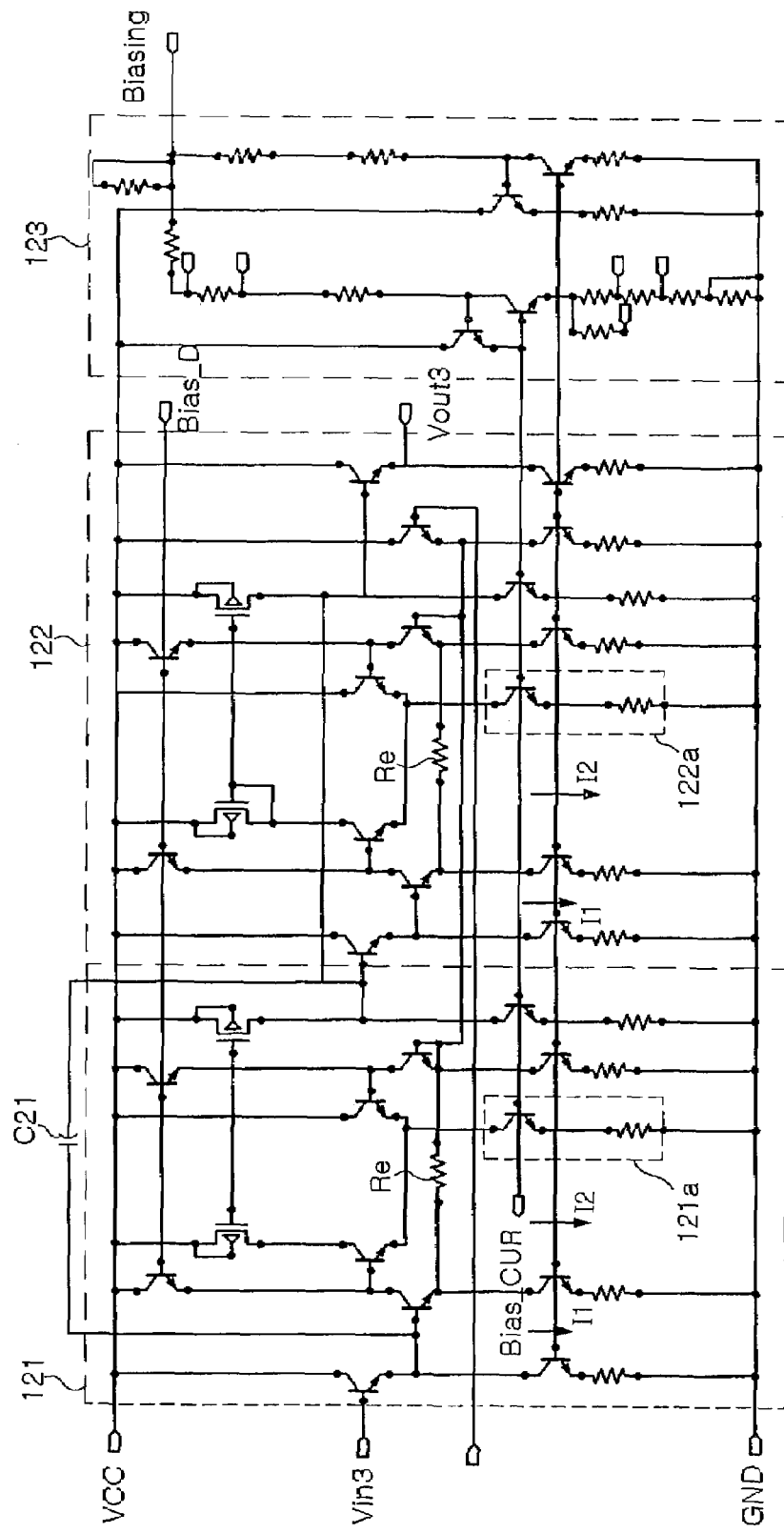
FIG. 12 is a circuit diagram showing a third filter of the C/L delay filter of the C/L delay compensating circuit shown in FIG. 8.

FIG. 12 is a circuit diagram of the third filter and compensation unit 83 including a capacitor C21 corresponding to the capacitor C of FIG. 10, first and second transconductors 121, 122, and a delay controlling circuit 123 controlling the bias current I2 of the first and second transconductors. In FIG. 12, Vin3 is an input signal terminal through which an output signal of the second filter is inputted to the third filter and compensation unit 83, Vout3 is an output signal terminal through which the group-delayed composite image signal is outputted from the third filter and compensation unit 83, and Biasing is a biasing terminal through which a bias signal is inputted to control the delay dispersion of the third filter and compensation unit 83.

The delay controlling circuit 123 controls a current of a current source inputted from the biasing terminal by using fusing to increase or decrease the bias current I2 of the first and second transconductor 121, 122. As a result, as shown in the formula 4, the delay time of the output signal of the output signal terminal Vout3 with respect to the input signal of the input signal terminal Vin3 is controlled by adjusting the gain of the first and second transconductors 121, 122.

Figure 13:
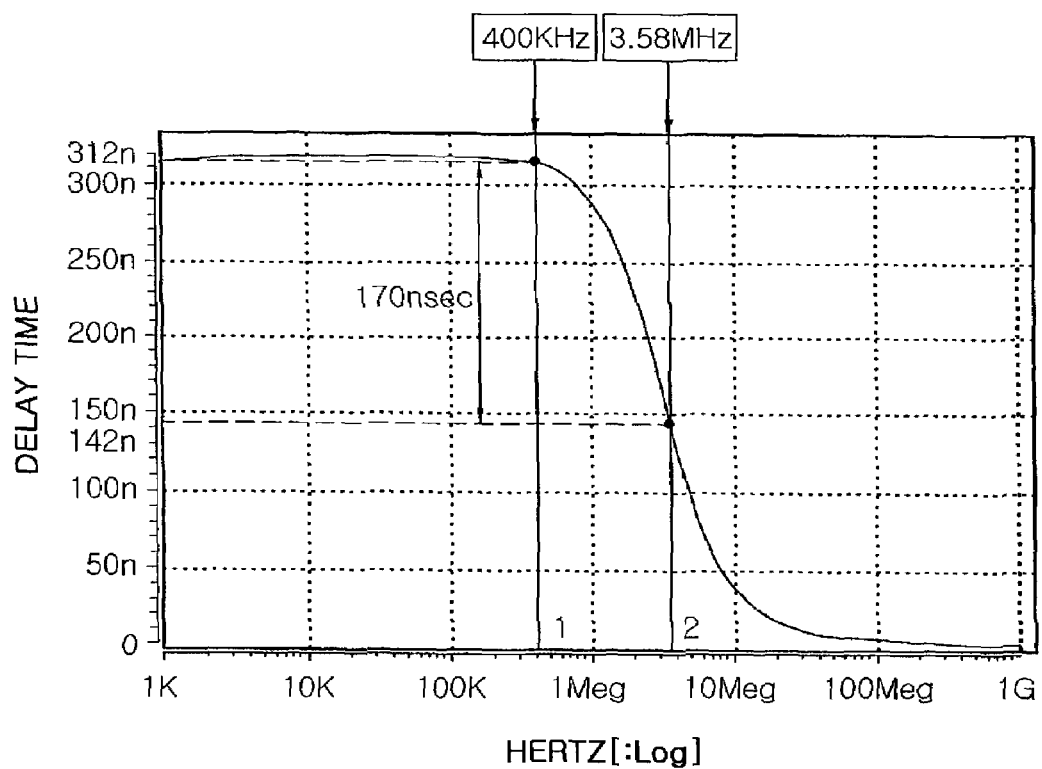
FIG. 13 is a graph showing a simulation result of the C/L delay filter shown of the C/L delay compensating circuit in FIG. 8.

That is, the third filter and compensation unit 83 obtains the group-delay of −170 nsec by compensating for the dispersion with respect to a target value, i.e., a C/L delay of −170 nsec, after the luminance signal is group-delayed by the first and second filter 81, 82. Since the delay dispersion of the delay controlling circuit 123 is adjusted by using fusing in a wafer test process, a delay control can be obtained using a process dispersion, i.e., adjustment of the delay dispersion in the wafer test process, without increasing a total area of the IC. FIG. 13 is a graph showing a delay time with respect to a frequency as a simulation result of the C/L delay filter shown in FIG. 8. The output signal of the delay filter, i.e., third filter and compensation unit 83 of FIG. 8, shows a delay difference of about −169 nsec in 400 KHz of the luminance signal with respect to 3.5 MHz of the chrominance signal. That is, the luminance signal is delayed with respect to the chrominance signal by 169 nsec, which complies with a standard of a general C/L delay.

Hereinafter, another C/L delay compensation unit 41a of FIG. 4 is explained in a case that the luminance signal and the chrominance signal are separately inputted to the C/L delay compensation unit 41a.

Figure 14:
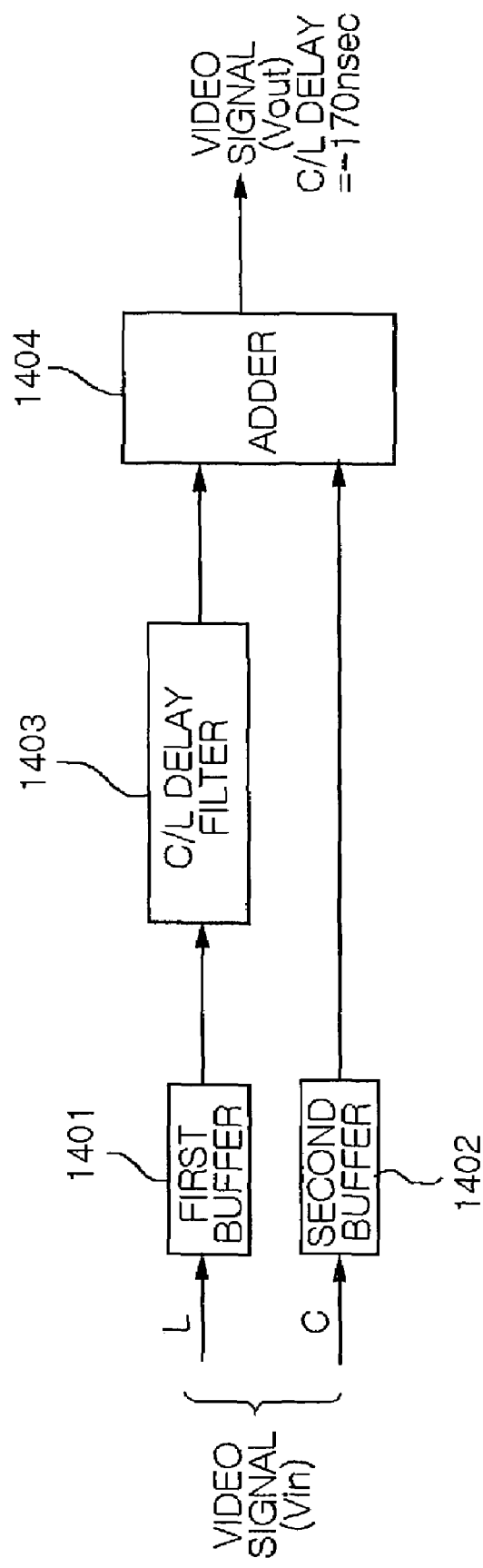
FIG. 14 is a block diagram showing another example of the C/L delay compensating circuit of the RF modulator shown in FIG. 4.

FIG. 14 is a block diagram of the C/L delay compensation unit 41a processing the video signal Vin having the separated luminance and chrominance signals. The C/L delay compensation unit 41a includes a first buffer 1401 controlling a first gain to a predetermined first level in response to the luminance signal, a second buffer 1402 controlling a second gain to a predetermined second level in response to the chrominance signal, a C/L delay filter 1403 delaying the luminance signal outputted from the first buffer by the delay time of 170 nsec, and an adder adding the luminance signal outputted from the C/L delay filter 1403 to the chrominance signal outputted from the second buffer 1402 to output the composite image signal.

According to the C/L delay compensation unit 41a having the above structure, the chrominance signal is not delayed, but the luminance signal is delayed by 170 nsec, the delayed luminance signal and the chrominance signal are combined in the adder 1404, and the composite image signal having the C/L delay of −170 nsec is outputted from the adder 1404.

The first and second buffers 1401, 1402 are input receivers receiving corresponding ones of the luminance signal and chrominance signal and also perform a gain control function of adjusting respective gains of the input luminance and chrominance signals.

Figure 15:
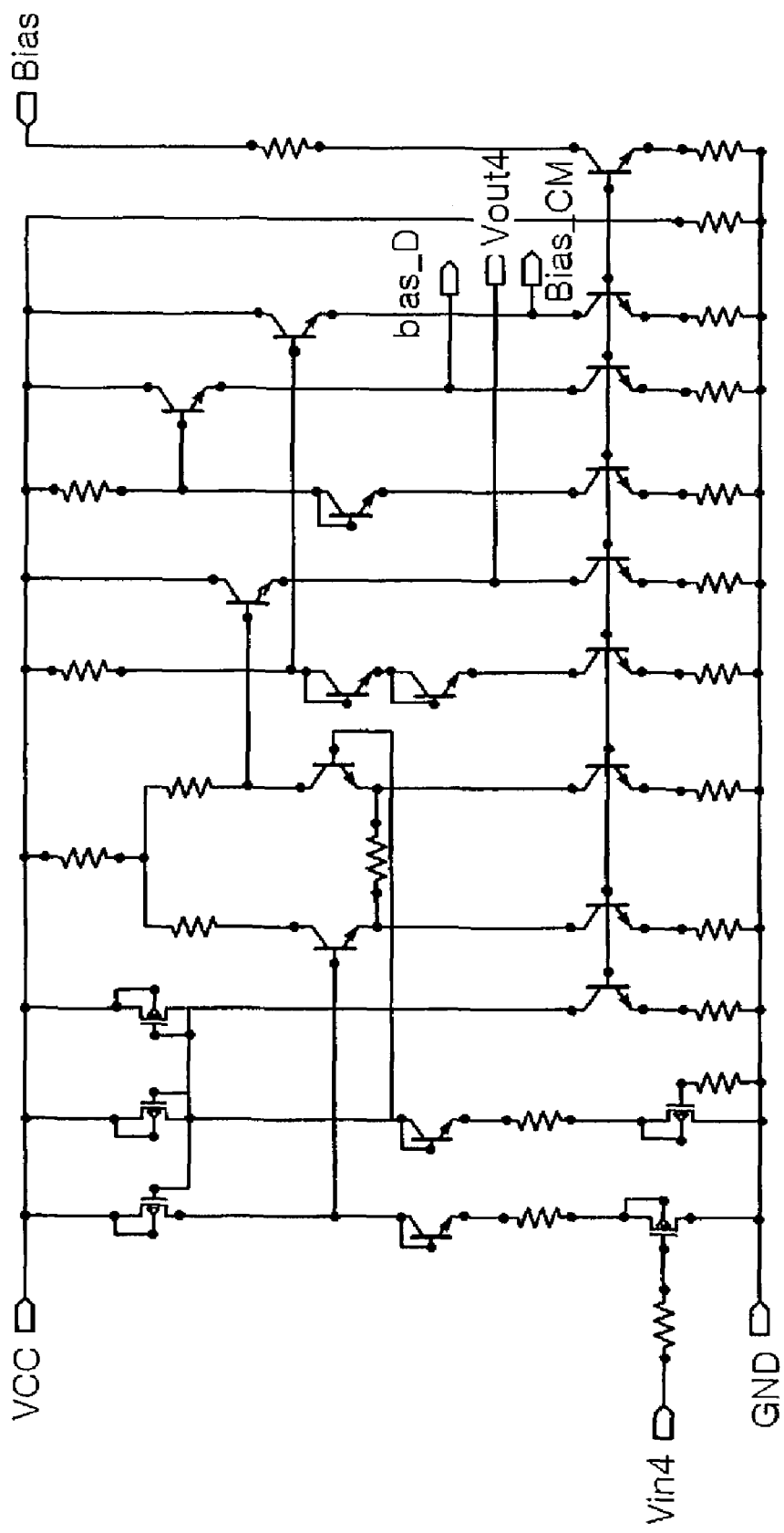
FIG. 15 is a circuit diagram showing first and second buffers of the C/L delay compensating circuit shown in RF modulator shown in FIG. 14.

FIG. 15 is a circuit diagram of the first and second buffers 1401, 1402, in which the input signals, i.e., the luminance signal and the chrominance signal, inputted through an input signal terminal Vin4 are outputted to an output signal terminal Vout4 after the gains of the input signals are adjusted according to bias inputs Bias-D and Bias_CM.

The first and second buffers 1401, 1402 is not limited to the circuit diagram shown in FIG. 15, but any circuit capable of adjusting a gain of an input signal can be used as the first and second buffers 1401, 1402.

The C/L delay filter 52 shown in FIGS. 6 and 8 can be used as the first and second buffers 1401, 1402. Although the first, second, and third filters 81 through 83 of FIG. 8 have a filter characteristic of delaying the luminance signal relative to the chrominance signal by 170 nsec, the first buffer 1401 of the C/L delay compensation unit 41a of FIG. 14 receives not the composite image having the combined luminance and chrominance signals but the separated luminance signal and has another filter characteristic, which is different from the that of the first, second, and third filters 81 through 83 of FIG. 8, by performing an absolute delay of 170 nsec on the separated luminance signal.

Figure 16:
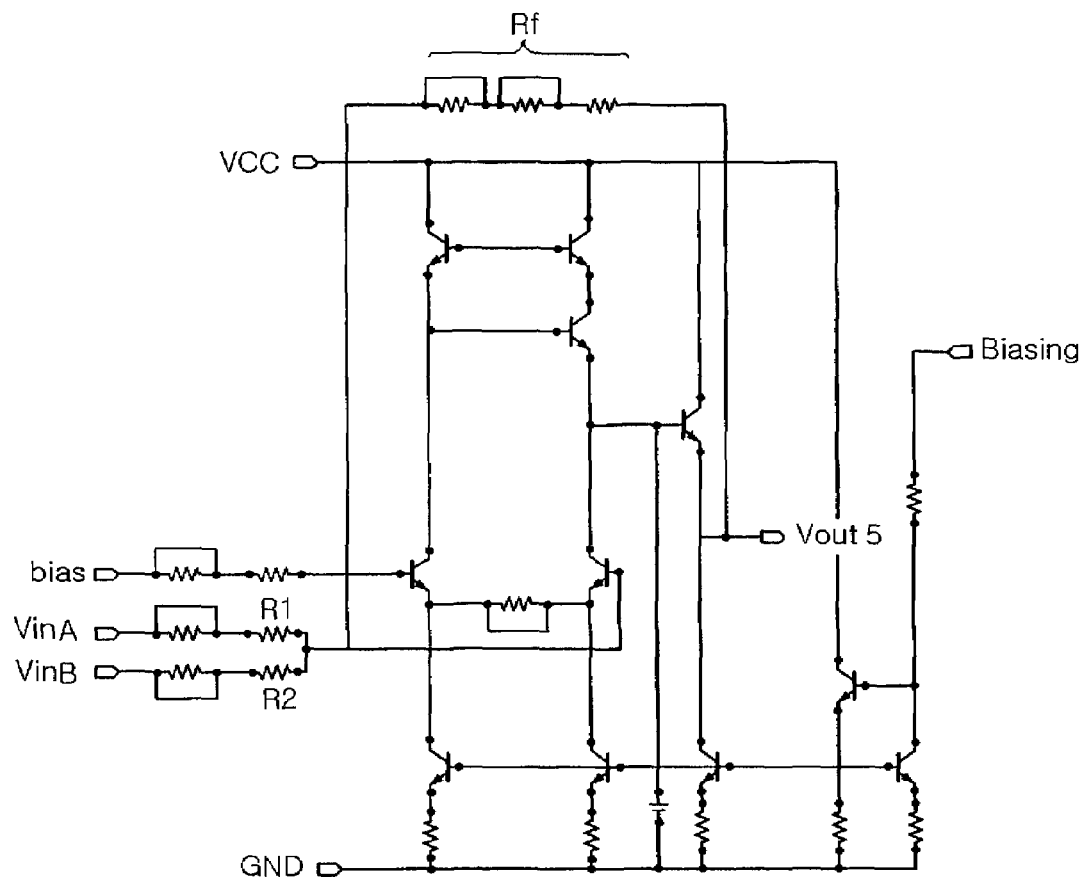
FIG. 16 is a circuit diagram showing an adder of the C/L delay compensating circuit shown in FIG. 14.

The adder 1404 outputs the composite image signal as a single signal, by adding the luminance signal delayed by the absolute delay of 170 nsec and outputted from the C/L delay filter 1403 to the chrominance signal outputted from the second buffer 1402 as shown in FIG. 16.

In FIG. 16, the luminance signal and the chrominance signal are inputted through input signal terminals VinA and VinB and resistors R1, R2, respectively. When a feedback resistance of feedback resistors coupled between an output signal terminal Vout5 and the input signal terminals VinA, VinB is RF, a relationship between the input signal and the output signal is expressed by the following formula 5.

$$Vout5 = -\frac{Rf}{R1} VinA + \frac{Rf}{R2} VinB \quad \text{Formula 5}$$

Here, if input resistance values of the resistors R1, R2 of the input signal terminals VinA, VinB are set to the same value, the input signals, e.g., the luminance signal and the chrominance signal, transmitted through the input signal terminals VinA, VinB are amplified and outputted after being added. Since the circuit diagram of FIG. 16 shows an example of the adder 1404, a structure of the adder 1404 is not necessarily limited to the circuit diagram shown in FIG. 16.

Figure 17:
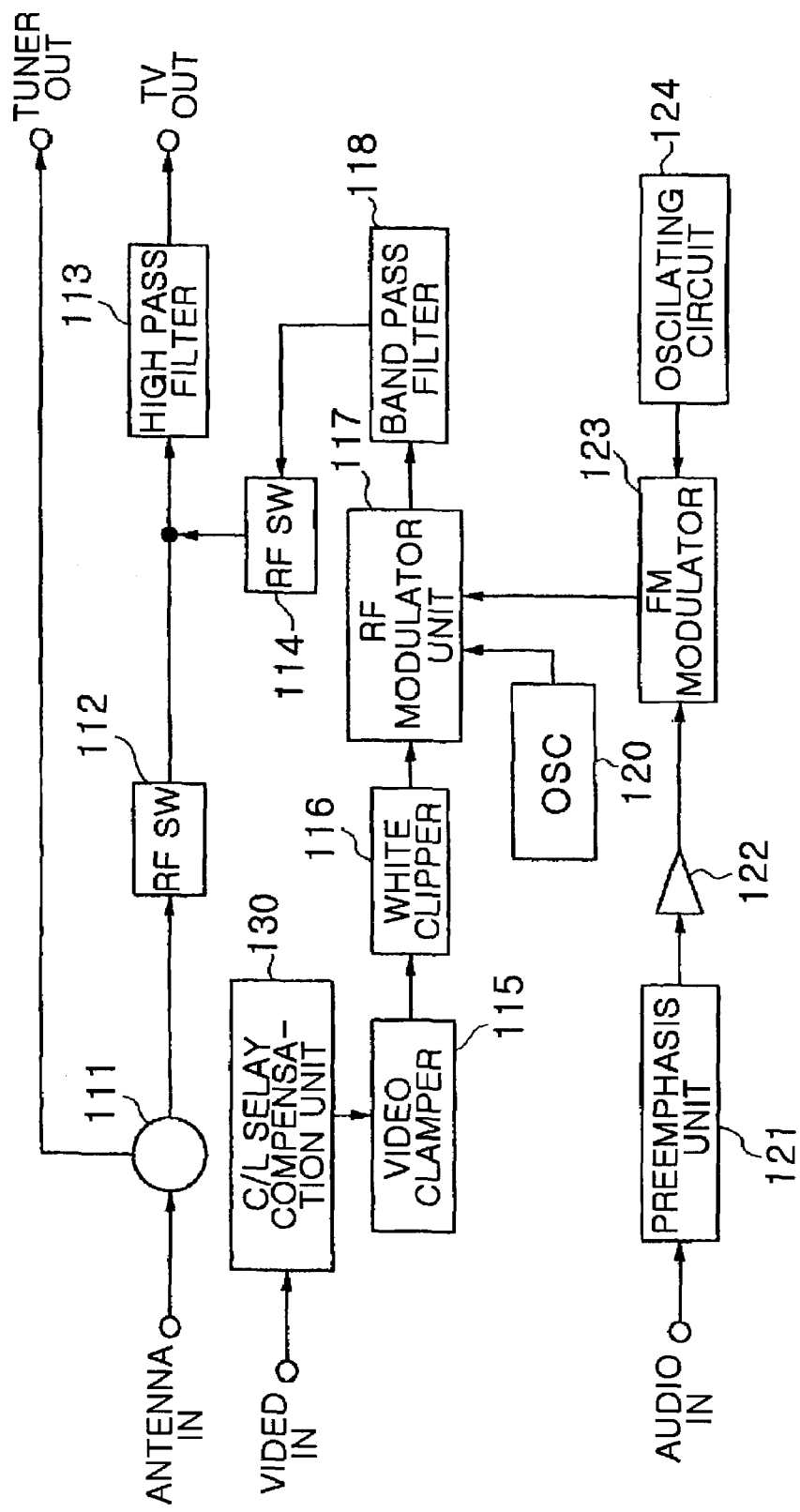
FIG. 17 is a block diagram showing an RF modulator having a C/L delay compensating function in a set-top-box according to another embodiment of the present invention.

FIG. 17 is a block diagram of a total structure of the RF modulator having the C/L delay compensation function in the STB. The RF modulator includes a divider 111 dividing an input high frequency signal received from the antenna ANT into two divided signals, a first high frequency switch 112 transmitting or blocking one of the divided signals, a second high frequency switch 114 transmitting or blocking high frequency modulated video and audio signals, a high pass filter 113 filtering high frequency signals received from the first high frequency switch 112 or the second high frequency switch 114 and outputting the filtered high frequency signal to a terminal TV OUT, a C/L delay compensation unit 130 separating the luminance signal and the chrominance signal from the composite image signal and delaying the chrominance signal with respect to the luminance signal by −170 nsec, a video damper 115 adjusting a level of the composite image signal outputted from the C/L delay compensation unit 130, a white clipper 116 removing a noise signal other than a desired frequency band signal from the composite image signal outputted from the video damper 115, a RF modulation unit 117 modulating the video signal/FM modulated audio signal outputted from the white clipper 116/FM modulator 123 by mixing the video signal/FM modulated audio signal with a local oscillating frequency signal and outputting the modulated video signal/FM audio signal, a band pass filter 118 removing a noise signal other than a desired frequency band signal from the output signal outputted from the RF modulation unit 117 and outputting the high frequency modulated video and audio signals to the second high frequency switch 114, an oscillator 120 generating the local oscillating frequency signal to the RF modulation unit 117, a pre-emphasis unit 121 emphasizing a high frequency portion of an audio signal inputted from an audio terminal AUDIO IN by a predetermined correction amount, an amplifier 122 amplifying the audio signal outputted from the pre-emphasis unit 121 to a predetermined level, an FM modulator 123 FM-modulating the audio signal outputted from the amplifier 122, and an oscillating circuit 124 providing a basic frequency signal to the FM modulator 123.

The luminance signal and the chrominance signal inputted to the video input terminal VIDEO IN are inputted to the C/L delay compensation unit 130. As described above, the C/L delay compensation unit 130 outputs the composite image signal having the luminance signal delayed by 170 nsec with respect to the chrominance signal, and the composite image signal having the C/L delay is level-adjusted in the video damper 115 and the white clipper 116 and is transmitted to the RF modulation unit 117. The audio signal of the base band inputted through the audio input terminal AUDIO IN has the frequency portion emphasized in the pre-emphasis unit 121 an inputted to the RF modulation unit 117 after being amplified in the amplifier 122 and FM-modulated in the FM modulator 123. The local oscillating frequency signal generated from the oscillator 120 is inputted to the RF modulation unit 117.

The RF modulation unit 117 modulates the composite image signal having the C/L delay of −170 nsec and the FM modulated audio signal with the local oscillating frequency signal inputted from the oscillator 120 and outputs the modulated signal. The modulated signal is outputted to the TV output terminal TV OUT through the high pass filter 113.

According to this invention, when the TV output terminal of the RF modulator is connected to the TV set, the TV set can obtain the demodulated video signal having the C/L delay of 0 nsec.

The C/L delay compensation unit 130 can be integrated in a single ship or a single package together with the divider 111, the first high frequency switch 112, the second high frequency switch 114, the high pass filter 113, the video clamper 115, the white clipper 116, the RF modulation unit 117, the band pass filter 118, the oscillator 120, the pre-emphasis unit 121, the amplifier 122, the FM modulator 123, the oscillating circuit 124.

As described above, since the RF modulator of the invention modulates and outputs the luminance signal and the chrominance signal having a C/L delay of 170 nsec, the structure of the RF modulator complies with the standard of the C/L delay.

Moreover, since the RF modulator having the C/L delay compensation function can be integrated in the single chip or the single package, noise occurring from a main board of the STB can be reduced, and the picture quality is improved.

Furthermore, since a STB manufacturer does not have to further design a structure for compensating for the C/L delay in a STB manufacturing process, a designing time and a manufacturing cost can be reduced. In addition, since any additional C/l delay compensation circuit is not needed, the STB becomes slim in size.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. A RF modulator formed in a single board, comprising:
   a C/L delay compensation unit receiving a video signal having a luminance signal and a chrominance signal, delaying the luminance signal by 170 nsec with respect to the chrominance signal in the video signal by performing a C/L delay function, and outputting the video signal having the delayed luminance signal; and
   a modulating unit modulating the video signal outputted from the C/L delay compensation unit to a high frequency signal of a broadcasting channel signal,
   wherein the video signal inputted to the C/L delay compensation unit comprises:
      a composite image signal having the combined luminance and chrominance signals,
   wherein the C/L delay compensation unit comprises:
      an input amplifier receiving the composite image signal as the video signal and amplifying the received composite image signal by a predetermined level;
      a C/L delay filter receiving the amplified composite image signal from the input amplifier, delaying the luminance signal by the 170 nsec with respect to the chrominance signal of the amplified composite image signal, and outputting the composite image signal having the delayed luminance signal and the chrominance signal; and
      an output amplifier amplifying the output composite image signal by a second predetermined level and outputting the amplified output composite image signal,
   wherein the C/L delay compensation unit comprises an input signal terminal, and the C/L delay filter comprises:
      a group equalization circuit including a first operational amplifier having a negative input terminal coupled to the input signal terminal through a first resistor and coupled to ground through a second resistor, a positive input terminal coupled to the input signal terminal through a first capacitor, and a first output terminal coupled to the negative input terminal through a third resistor coupled between ground and a junction between the first capacitor and the positive input terminal.

2. The RE modulator of claim 1, wherein the C/L delay compensation unit comprises a notch filter coupled to the group equalization circuit and the notch filter comprises,
   a second operational amplifier having a second positive terminal coupled to the ground and a second negative input terminal receiving an output of the group-delay equalization circuit through a fourth resistor, a fifth resistor coupled to ground, and a second capacitor, and a positive input terminal coupled to the ground, and a second output terminal coupled to the negative input terminal through a sixth resistor and through a third capacitor and the second capacitor; and
   a third operational amplifier having a third positive input terminal coupled to the ground, a third negative input terminal receiving the output of the first operational amplifier through a seventh resistor and receiving an output of the second operational amplifier through an eight resistor, and a third output terminal coupled to the third negative input terminal through a ninth resistor.

3. The RE modulator of claim 1, wherein the C/L delay filter comprises
   a plurality of delay filters coupled in a series to delay the luminance signal relative to the chrominance signal in the composite image signal; and
   a delay filter and compensation unit controlling a delay dispersion of the composite image signal having the luminance signal delayed by the 170 nsec with respect to the chrominance signal.

4. The RF modulator of claim 3, wherein each delay filter comprises:
   an input signal terminal;
   an output signal terminal;
   a first gain-cell transconductor having a first negative input terminal coupled to the input signal terminal, a first positive input terminal coupled to ground, and an first output terminal coupled to the output signal terminal;
   a second gain-cell transconductor having a second negative input terminal coupled to the output signal terminal, a second positive input terminal coupled to the ground, a second output terminal coupled to the first output terminal of the first gain-cell transconductor; and
   a capacitor coupled between the input signal terminal and the output signal terminal and to the first and second output terminals of the first and second gain-cell transconductors to output the luminance signal delayed relative to the chrominance signal according to a gain of the first and second gain-cell transconductors.

5. The RF modulator of claim 3, wherein each delay filter comprises:
   an input signal terminal;
   an output signal terminal;
   a first gain-cell transconductor having a first negative input terminal coupled to the input signal terminal Vin2, a first positive input terminal coupled to ground, and a first output terminal coupled to the output signal terminal;
   a second gain-cell transconductor having a second negative input terminal coupled to the output signal terminal, a second positive input terminal coupled to the ground, a second output terminal coupled to the first output terminal of the first gain-cell transconductor;
   a capacitor coupled between the input signal terminal and the output signal terminal and to the first and second output terminals of the first and second gain-cell transconductors; and
   a delay compensation circuit increasing and decreasing a bias current of the first and second gain-cell transconductors by controlling a source current according to fusing of the first and second gain-cell transconductors to output the luminance signal delayed relative to the chrominance signal according to a gain of the first and second gain-cell transconductors.

6. A RF modulator formed in a single board, comprising:
   a C/L delay compensation unit receiving a video signal having a luminance signal and a chrominance signal, delaying the luminance signal by 170 nsec with respect to the chrominance signal in the video signal by performing a C/L delay function, and outputting the video signal having the delayed luminance signal; and a modulating unit modulating the video signal outputted from the C/L delay compensation unit to a high frequency signal of a broadcasting channel signal, wherein the luminance signal and the chrominance signal of the video signal inputted to the C/L delay compensation unit are separated from each other, wherein the C/L delay compensation unit comprises:
  a C/L delay filter delaying the luminance signal; and
  an adder adding the delayed luminance signal to the chrominance signal to generate a composite image signal, wherein the C/L delay compensation unit comprises:
  a first buffer controlling the luminance signal of the video signal to a predetermined first level using a first gain; and
  a second buffer controlling the chrominance signal to a predetermined second level using a second gain.

7. The RF modulator of claim 6, wherein the C/L delay compensation unit comprises an input signal terminal, and the C/L delay filter comprises:
  a group equalization circuit including a first operational amplifier having a negative input terminal coupled to the input signal terminal through a first resistor and coupled to ground through a second resistor, a positive input terminal coupled to the input signal terminal through a first capacitor, and a first output terminal coupled to the negative input terminal through a third resistor coupled between ground and a junction between the first capacitor and the positive input terminal.

8. The RF modulator of claim 7, wherein the C/L delay compensation unit comprises a notch filter coupled to the group equalization circuit, and the notch filter comprises,
  a second operational amplifier having a second positive terminal coupled to the ground and a second negative input terminal receiving an output of the group-delay equalization circuit through a fourth resistor, a fifth resistor coupled to ground, and a second capacitor, and a positive input terminal coupled to the ground, and a second output terminal coupled to the negative input terminal through a sixth resistor and through a third capacitor and the second capacitor; and
  a third operational amplifier having a third positive input terminal coupled to the ground, a third negative input terminal receiving the output of the first operational amplifier through a seventh resistor and receiving an output of the second operational amplifier through an eight resistor, and a third output terminal coupled to the negative input terminal through a ninth resistor.

9. The RF modulator of claim 6, wherein the C/L delay filter comprises
  a plurality of delay filters coupled in a series to delay the luminance signal relative to the chrominance signal in the composite image signal; and
  a delay filter and compensation unit controlling a delay dispersion of the composite image signal having the luminance signal delayed by the 170 nsec with respect to the chrominance signal.

10. The RE modulator of claim 9, wherein each delay filter comprises:
  an input signal terminal;
  an output signal terminal;

a first gain-cell transconductor having a first negative input terminal coupled to the input signal terminal, a first positive input terminal coupled to ground, and a first output terminal coupled to the output signal terminal;

a second gain-cell transconductor having a second negative input terminal coupled to the output signal terminal, a second positive input terminal coupled to the ground, a second output terminal coupled to the first output terminal of the first gain-cell transconductor; and a capacitor coupled between the input signal terminal and the output signal terminal and to the first and second output terminals of the first and second gain-cell transconductors to output the luminance signal delayed relative to the chrominance signal according to a gain of the first and second gain-cell transconductors.

11. The RF modulator of claim 9, wherein the delay filter and compensation unit comprises:
  an input signal terminal;
  an output signal terminal;
  a first gain-cell transconductor having a first negative input terminal coupled to the input signal terminal, a first positive input terminal coupled to ground, and a first output terminal coupled to the output signal terminal;
  a second gain-cell transconductor having a second negative input terminal coupled to the output signal terminal, a second positive input terminal coupled to the ground, a second output terminal coupled to the first output terminal of the first gain-cell transconductor; and
  a capacitor coupled between the input signal terminal and the output signal terminal and to the first and second output terminals of the first and second gain-cell transconductors; and
  a delay compensation circuit increasing and decreasing a bias current of the first and second gain-cell transconductors by controlling a source current according to fusing of the first and second gain-cell transconductors to output the luminance signal delayed relative to the chrominance signal according to a gain of the first and second gain-cell transconductors.

12. A set-top-box mounted a RF modulator, wherein the RF modulator is comprised:
  a C/L delay compensation unit receiving a video signal having a luminance signal and a chrominance signal, delaying the luminance signal by 170 nsec with respect to the chrominance signal in the video signal by performing a C/L delay function, and outputting the video signal having the delayed luminance signal; and
  a modulating unit modulating the video signal outputted from the C/L delay compensation unit to a high frequency signal of a broadcasting channel signal,
  wherein the video signal inputted to the C/L delay compensation unit comprises:
  a composite image signal having the combined luminance and chrominance signals, wherein the C/L delay compensation unit comprises:
  an input amplifier receiving the composite image signal as the video signal and amplifying the received composite image signal by a predetermined level:
  a C/L delay filter receiving the amplified composite image signal from the input amplifier, delaying the luminance signal by the 170 nsec with respect to the chrominance signal of the amplified composite image signal, and outputting the composite image signal having the delayed luminance signal and the chrominance signal; and an output amplifier amplifying the output composite image signal by a second predetermined level and outputting the amplified output composite image signal, wherein the C/L delay compensation unit comprises an input signal terminal, and the C/L delay filter comprises:

a group equalization circuit including a first operational amplifier having a negative input terminal coupled to the input signal terminal through a first resistor and coupled to ground through a second resistor, a positive input terminal coupled to the input signal terminal through a first capacitor, and a first output terminal coupled to the negative input terminal through a third resistor coupled between ground and a junction between the first capacitor and the positive input terminal.

13. The set-top-box of claim 12, wherein the C/L delay compensation unit comprises a notch filter coupled to the group equalization circuit, and the notch filter comprises, a second operational amplifier having a second positive terminal coupled to the ground and a second negative input terminal receiving an output of the group-delay equalization circuit through a fourth resistor, a fifth resistor coupled to ground, and a second capacitor, and a positive input terminal coupled to the ground, and a second output terminal coupled to the negative input terminal through a sixth resistor and through a third capacitor and the second capacitor; and a third operational amplifier having a third positive input terminal coupled to the ground, a third negative input terminal receiving the output of the first operational amplifier through a seventh resistor and receiving an output of the second operational amplifier through an eight resistor, and a third output terminal coupled to the third negative input terminal through a ninth resistor.

14. The set-top-box of claim 12, wherein the C/L delay filter comprises a plurality of delay filters coupled in a series to delay the luminance signal relative to the chrominance signal in the composite image signal; and a delay filter and compensation unit controlling a delay dispersion of the composite image signal having the luminance signal delayed by the 170 nsec with respect to the chrominance signal.

15. The set-top-box of claim 14, wherein each delay filter comprises:

an input signal terminal;

an output signal terminal;

a first gain-cell transconductor having a first negative input terminal coupled to the input signal terminal, a first positive input terminal coupled to ground, and an first output terminal coupled to the output signal terminal;

a second gain-cell transconductor having a second negative input terminal coupled to the output signal terminal, a second positive input terminal coupled to the ground, a second output terminal coupled to the first output terminal of the first gain-cell transconductor; and a capacitor coupled between the input signal terminal and the output signal terminal and to the first and second output terminals of the first and second gain-cell transconductors to output the luminance signal delayed relative to the chrominance signal according to a gain of the first and second gain-cell transconductors.

16. The set-top-box of claim 14, wherein each delay filter comprises:

an input signal terminal;

an output signal terminal;

a first gain-cell transconductor having a first negative input terminal coupled to the input signal terminal Vin2, a first positive input terminal coupled to ground, and a first output terminal coupled to the output signal terminal;

a second gain-cell transconductor having a second negative input terminal coupled to the output signal terminal, a second positive input terminal coupled to the ground, a second output terminal coupled to the first output terminal of the first gain-cell transconductor;

a capacitor coupled between the input signal terminal and the output signal terminal and to the first and second output terminals of the first and second gain-cell transconductors; and a delay compensation circuit increasing and decreasing a bias current of the first and second gain-cell transconductors by controlling a source current according to fusing of the first and second gain-cell transconductors to output the luminance signal delayed relative to the chrominance signal according to a gain of the first and second gain-cell transconductors.

17. A set-top-box mounted a RF modulator, wherein the RF modulator is comprised:

a C/L delay compensation unit receiving a video signal having a luminance signal and a chrominance signal, delaying the luminance signal by 170 nsec with respect to the chrominance signal in the video signal by performing a C/L delay function, and outputting the video signal having the delayed luminance signal; and a modulating unit modulating the video signal outputted from the C/L delay compensation unit to a high frequency signal of a broadcasting channel signal, wherein the luminance signal and the chrominance signal of the video signal inputted to the C/L delay compensation unit are separated from each other, wherein the C/L delay compensation unit comprises:

a C/L delay filter delaying the luminance signal; and an adder adding the delayed luminance signal to the chrominance signal to generate a composite image signal, wherein the C/L delay compensation unit comprises:

a first buffer controlling the luminance signal of the video signal to a predetermined first level using a first gain; and a second buffer controlling the chrominance signal to a predetermined second level using a second gain.

18. The set-top-box of claim 17, wherein the C/L delay compensation unit comprises an input signal terminal, and the C/L delay filter comprises:

a group equalization circuit including a first operational amplifier having a negative input terminal coupled to the input signal terminal through a first resistor and coupled to ground through a second resistor, a positive input terminal coupled to the input signal terminal through a first capacitor, and a first output terminal coupled to the negative input terminal through a third resistor coupled between ground and a junction between the first capacitor and the positive input terminal.

19. The set-top-box of claim 18, wherein the C/L delay compensation unit comprises a notch filter coupled to the group equalization circuit, and the notch filter comprises,
- a second operational amplifier having a second positive terminal coupled to the ground and a second negative input terminal receiving an output of the group-delay equalization circuit through a fourth resistor, a fifth resistor coupled to ground, and a second capacitor, and a positive input terminal coupled to the ground, and a second output terminal coupled to the negative input terminal through a sixth resistor and through a third capacitor and the second capacitor; and
- a third operational amplifier having a third positive input terminal coupled to the ground, a third negative input terminal receiving the output of the first operational amplifier through a seventh resistor and receiving an output of the second operational amplifier through an eight resistor, and a third output terminal coupled to the negative input terminal through a ninth resistor.

20. The set-top-box of claim 17, wherein the C/L delay filter comprises
- a plurality of delay filters coupled in a series to delay the luminance signal relative to the chrominance signal in the composite image signal; and
- a delay filter and compensation unit controlling a delay dispersion of the composite image signal having the luminance signal delayed by the 170 nsec with respect to the chrominance signal.

21. The set-top-box of claim 20, wherein each delay filter comprises:
- an input signal terminal;
- an output signal terminal;
- a first gain-cell transconductor having a first negative input terminal coupled to the input signal terminal, a first positive input terminal coupled to ground, and a first output terminal coupled to the output signal terminal;
- a second gain-cell transconductor having a second negative input terminal coupled to the output signal terminal, a second positive input terminal coupled to the ground, a second output terminal coupled to the first output terminal of the first gain-cell transconductor; and
- a capacitor coupled between the input signal terminal and the output signal terminal and to the first and second output terminals of the first and second gain-cell transconductors to output the luminance signal delayed relative to the chrominance signal according to a gain of the first and second gain-cell transconductors.

22. The set-top-box of claim 20, wherein the delay filter and compensation unit comprises:
- an input signal terminal;
- an output signal terminal;
- a first gain-cell transconductor having a first negative input terminal coupled to the input signal terminal, a first positive input terminal coupled to ground, and a first output terminal coupled to the output signal terminal;
- a second gain-cell transconductor having a second negative input terminal coupled to the output signal terminal, a second positive input terminal coupled to the ground, a second output terminal coupled to the first output terminal of the first gain-cell transconductor; and
- a capacitor coupled between the input signal terminal and the output signal terminal and to the first and second output terminals of the first and second gain-cell transconductors; and
- a delay compensation circuit increasing and decreasing a bias current of the first and second gain-cell transconductors by controlling a source current according to fusing of the first and second gain-cell transconductors to output the luminance signal delayed relative to the chrominance signal according to a gain of the first and second gain-cell transconductors.

* * * * *